United States Patent
Le et al.

(10) Patent No.: US 9,990,291 B2
(45) Date of Patent: Jun. 5, 2018

(54) AVOIDING DEADLOCKS IN PROCESSOR-BASED SYSTEMS EMPLOYING RETRY AND IN-ORDER-RESPONSE NON-RETRY BUS COHERENCY PROTOCOLS

(71) Applicant: QUALCOMM Incorporated, San Diego, CA (US)

(72) Inventors: Hien Minh Le, Cedar Park, TX (US); Thuong Quang Truong, Austin, TX (US); Kun Xu, Austin, TX (US); Jaya Prakash Subramaniam Ganasan, Youngsville, NC (US); Cesar Aaron Ramirez, Hutto, TX (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 14/863,645

(22) Filed: Sep. 24, 2015

(65) Prior Publication Data
US 2017/0091098 A1   Mar. 30, 2017

(51) Int. Cl.
*G06F 12/08* (2016.01)
*G06F 12/0831* (2016.01)
(Continued)

(52) U.S. Cl.
CPC ...... *G06F 12/0831* (2013.01); *G06F 12/0815* (2013.01); *G06F 13/16* (2013.01);
(Continued)

(58) Field of Classification Search
CPC .. G06F 12/0831; G06F 13/16; G06F 13/4027; G06F 13/42
(Continued)

(56) References Cited

U.S. PATENT DOCUMENTS

| 6,487,643 B1 * | 11/2002 | Khare | G06F 12/0815 |
| | | | 711/148 |
| 8,626,968 B2 * | 1/2014 | Vash | G06F 13/1642 |
| | | | 710/15 |

(Continued)

FOREIGN PATENT DOCUMENTS

| WO | WO 9635175 A2 * | 11/1996 | ........... G06F 13/364 |
| WO | 2013177295 A2 | 11/2013 | |

OTHER PUBLICATIONS

Daya, Bhavya K. et al., "SCORPIO: A 36-Core Research Chip Demonstrating Snoopy Coherence on a Scalable Mesh NoC with In-Network Ordering," 41st International Symposium on Computer Architecture, ISCA 2014, IEEE, Minneapolis, MN, Jun. 14-18, 2014, 13 pages.

(Continued)

*Primary Examiner* — Pierre-Michel Bataille
(74) *Attorney, Agent, or Firm* — W&T/Qualcomm

(57) ABSTRACT

Aspects disclosed herein include avoiding deadlocks in processor-based systems employing retry and in-order-response non-retry bus coherency protocols. In this regard, an interface bridge circuit is communicatively coupled to a first core device that implements a retry bus coherency protocol, and a second core device that implements an in-order-response non-retry bus coherency protocol. The interface bridge circuit receives a snoop command from the first core device, and forwards the snoop command to the second core device. While the snoop command is pending, the interface bridge circuit detects a potential deadlock condition between the first core device and the second core device. In response to detecting the potential deadlock condition, the interface bridge circuit is configured to send a retry response to the first core device. This enables the first core device to (Continued)

continue processing, thereby eliminating the potential deadlock condition.

21 Claims, 8 Drawing Sheets

(51) Int. Cl.
*G06F 13/16* (2006.01)
*G06F 13/40* (2006.01)
*G06F 13/42* (2006.01)
*G06F 12/0815* (2016.01)
*G06F 9/52* (2006.01)

(52) U.S. Cl.
CPC .......... *G06F 13/4027* (2013.01); *G06F 13/42* (2013.01); *G06F 9/524* (2013.01); *G06F 12/0833* (2013.01); *G06F 2212/1008* (2013.01); *G06F 2212/621* (2013.01)

(58) Field of Classification Search
USPC ................................................. 711/146, 141
See application file for complete search history.

(56) References Cited

U.S. PATENT DOCUMENTS

| | | | |
|---|---|---|---|
| 2003/0120874 A1* | 6/2003 | Deshpande | G06F 12/0811 711/141 |
| 2006/0190661 A1 | 8/2006 | Ogilvie et al. | |
| 2006/0190667 A1 | 8/2006 | Drehmel et al. | |
| 2007/0079074 A1* | 4/2007 | Collier | G06F 12/082 711/141 |
| 2011/0252165 A1* | 10/2011 | Keller | G06F 12/0831 710/52 |
| 2013/0111148 A1 | 5/2013 | Lecler | |
| 2013/0318308 A1 | 11/2013 | Jayasimha et al. | |
| 2014/0115272 A1 | 4/2014 | Pierson et al. | |
| 2014/0372654 A1* | 12/2014 | Pelt | G06F 13/4027 710/305 |
| 2015/0120978 A1* | 4/2015 | Kalyanasundharam | G06F 12/1009 710/267 |

OTHER PUBLICATIONS

Hansson, Andreas et al., "Avoiding Message-Dependent Deadlock in Network-Based Systems on Chip," VLSI Design, vol. 2007, Hindawi Publishing Corporation, 2007, 10 pages.
Stevens, Ashley, "Introduction to AMBA® 4 ACE™ and big. LITTLE™ Processing Technology," ARM White Paper, CoreLink Intelligent System IP by ARM, Jun. 6, 2011, Updated Jul. 29, 2013, 15 pages.
International Search Report and Written Opinion for PCT/US2016/050961, dated Dec. 6, 2016, 11 pages.
Second Written Opinion for PCT/US2016/050961, dated Sep. 25, 2017, 6 pages.
International Preliminary Report on Patentability for PCT/US2016/050961, dated Jan. 2, 2018, 20 pages.

* cited by examiner

AVOIDING DEADLOCKS IN PROCESSOR-BASED SYSTEMS EMPLOYING RETRY AND IN-ORDER-RESPONSE NON-RETRY BUS COHERENCY PROTOCOLS

BACKGROUND

I. Field of the Disclosure

The technology of the disclosure relates generally to snoop-based cache coherency in processor-based systems, and, in particular, to avoiding potential deadlock conditions among devices employing different bus coherency protocols.

II. Background

Many conventional processor-based systems, such as System-on-Chips (SoCs) based on the ARM architecture, may include multiple core devices (e.g., central processing units (CPUs), graphics processing units (GPUs), processor clusters, and/or hardware accelerators, as non-limiting examples), each of which may access shared data and maintain its own cache of the shared data. To ensure that the cache of each core device within a processor-based system contains the most up-to-date version of the shared data, the core devices may implement bus coherency protocols for maintaining cache coherency among the caches. One class of bus coherency protocols is based on a mechanism known as "snooping." Using snooping, each core device monitors a bus to detect all read and write requests that originate from other core devices and that involve data that is shared among the core devices. If a core device detects (or "snoops") a read request for which it has the most up-to-date data, the core device may provide the requested data to a requesting core device. If the core device snoops a write transaction on the bus, the core device may invalidate its local copy of the written data within its cache. In this manner, a consistent view of the shared data may be provided to all of the core devices within the processor-based system.

To provide additional functionality, processor-based systems may support a mix of bus coherency protocols. For example, a processor-based system may include ARM core devices that implement a particular bus coherency protocol (e.g., the Advanced Extensible Interface (AXI) Coherency Extensions (ACE) bus coherency protocol) alongside proprietary core devices employing in-house proprietary bus coherency protocols. A proprietary bus coherency protocol may provide added features and requirements to enable higher performance and ability to handle a larger number of bus agents. One such requirement may dictate that a core device that receives a snoop command must provide a snoop response in a timely fashion (i.e., there should exist no dependency between a snoop response and one of the core device's own outbound requests, such as a write operation). The proprietary bus coherency protocol may satisfy this requirement by implementing a retry capability, enabling the core device to send a retry response to a snoop command if the core device cannot service the snoop command for any reason. Such proprietary bus coherency protocols may be referred to herein as "retry bus coherency protocols."

However, some protocols such as the ACE protocol are relatively simple non-retry protocols that process outgoing responses in order (also referred to herein as "in-order-response non-retry bus coherency protocols"). As a result, for a core device implementing an in-order-response non-retry bus coherency protocol, a dependency may exist between a snoop command to an address, and a write operation to that same address. A processor-based system that employs both a retry bus coherency protocol and an in-order-response non-retry bus coherency protocol in the same coherency domain thus may experience a deadlock of requests. Accordingly, it is desirable to provide a deadlock avoidance mechanism that is efficient in terms of area and power consumption, and that does not involve internal changes to existing bus coherency protocols or core devices.

SUMMARY OF THE DISCLOSURE

Aspects disclosed herein include avoiding deadlocks in processor-based systems employing retry and in-order-response non-retry bus coherency protocols. In this regard, in one aspect, an interface bridge circuit is provided (e.g., as part of a processor-based system). The interface bridge circuit is communicatively coupled to a first core device that implements a retry bus coherency protocol such as a proprietary protocol, as a non-limiting example. The interface bridge circuit is also communicatively coupled to a second core device that implements an in-order-response non-retry protocol (e.g., the Advanced Extensible Interface (AXI) Coherency Extensions (ACE) bus coherency protocol, as a non-limiting example). The interface bridge circuit is configured to receive a snoop command from the first core device, and forward the snoop command to the second core device. While the snoop command is pending (i.e., before a snoop response is received from the second core device), the interface bridge circuit detects a potential deadlock condition between the first core device and the second core device. In some aspects, detecting the potential deadlock condition may include detecting an address collision between the snoop command and a subsequent write operation sent by the second core device, and/or detecting an expiration of a countdown timer that is activated when the snoop command waits for a snoop response. In response to detecting the potential deadlock condition, the interface bridge circuit is configured to send a retry response to the first core device. This enables the first core device to continue processing, thereby eliminating the potential deadlock condition. In this manner, the interface bridge circuit resolves the potential deadlock condition as soon as it is detected, while maintaining compatibility with existing bus coherency protocols and core devices and involving no modifications to existing busses.

In another aspect, an interface bridge circuit is provided. The interface bridge circuit is communicatively coupled to a first core device implementing a retry bus coherency protocol, and a second core device implementing an in-order-response non-retry bus coherency protocol. The interface bridge circuit is configured to receive a snoop command from the first core device, and forward the snoop command to the second core device. The interface bridge circuit is further configured to detect a potential deadlock condition between the first core device and the second core device while the snoop command is pending. The interface bridge circuit is also configured to, responsive to detecting the potential deadlock condition, send a retry response to the first core device.

In another aspect, a processor-based system is provided. The processor-based system comprises a first core device implementing a retry bus coherency protocol, and a second core device implementing an in-order-response non-retry bus coherency protocol. The processor-based system further comprises an interface bridge circuit communicatively coupled to the first core device and the second core device. The interface bridge circuit is configured to receive a snoop command from the first core device, and forward the snoop command to the second core device. The interface bridge circuit is further configured to detect a potential deadlock condition between the first core device and the second core device while the snoop command is pending. The interface bridge circuit is also configured to, responsive to detecting the potential deadlock condition, send a retry response to the first core device.

In another aspect, an interface bridge circuit is provided. The interface bridge circuit comprises a means for receiving a snoop command from a first core device implementing a retry bus coherency protocol. The interface bridge circuit further comprises a means for forwarding the snoop command to a second core device implementing an in-order-response non-retry bus coherency protocol. The interface bridge circuit also comprises a means for detecting a potential deadlock condition between the first core device and the second core device while the snoop command is pending. The interface bridge circuit additionally comprises a means for sending a retry response to the first core device responsive to detecting the potential deadlock condition.

In another aspect, a method for avoiding deadlocks among IP cores of processor-based systems is provided. The method comprises receiving, by an interface bridge circuit of a processor-based system, a snoop command from a first core device implementing a retry bus coherency protocol. The method further comprises forwarding the snoop command to a second core device implementing an in-order-response non-retry bus coherency protocol. The method also comprises detecting a potential deadlock condition between the first core device and the second core device while the snoop command is pending. The method additionally comprises responsive to detecting the potential deadlock condition, sending a retry response to the first core device.

DETAILED DESCRIPTION

Figure 1:
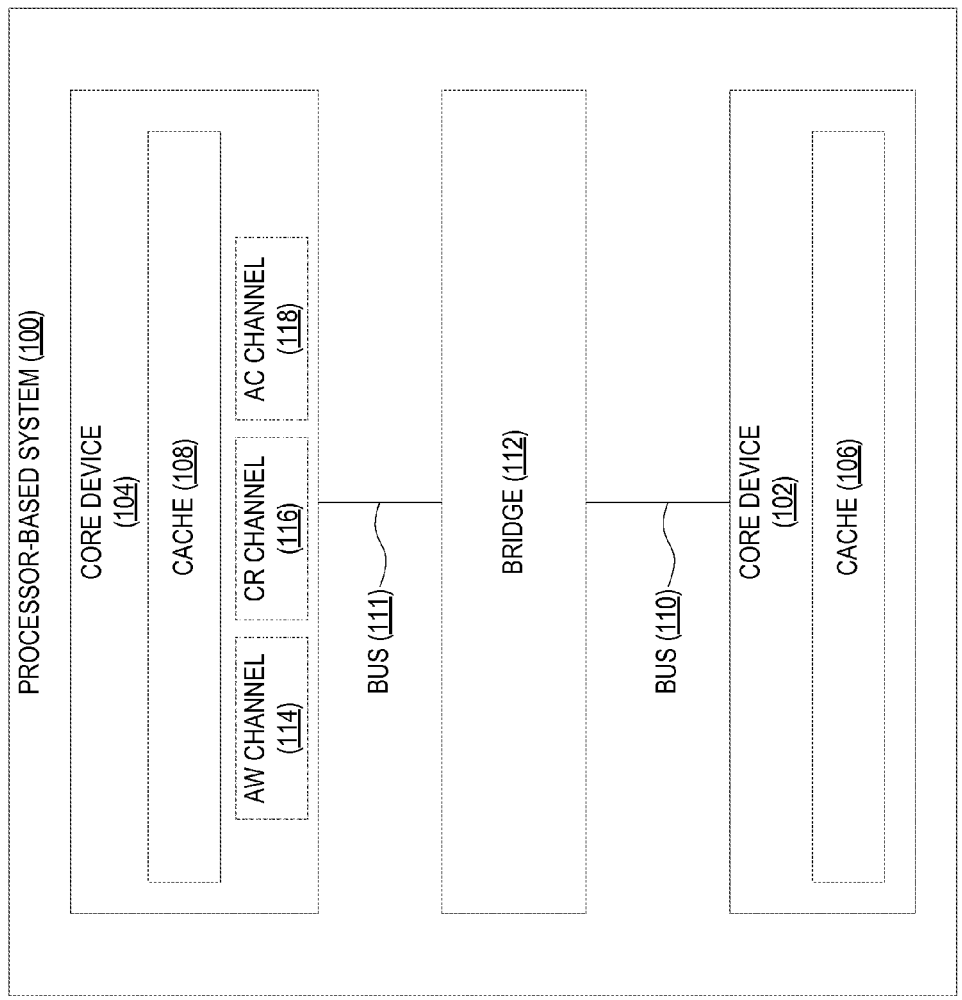
FIG. 1 is a block diagram of an exemplary processor-based system in which deadlocks may arise between a first core device implementing a retry bus coherency protocol, and a second core device implementing an in-order-response non-retry bus coherency protocol.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Figure 2:
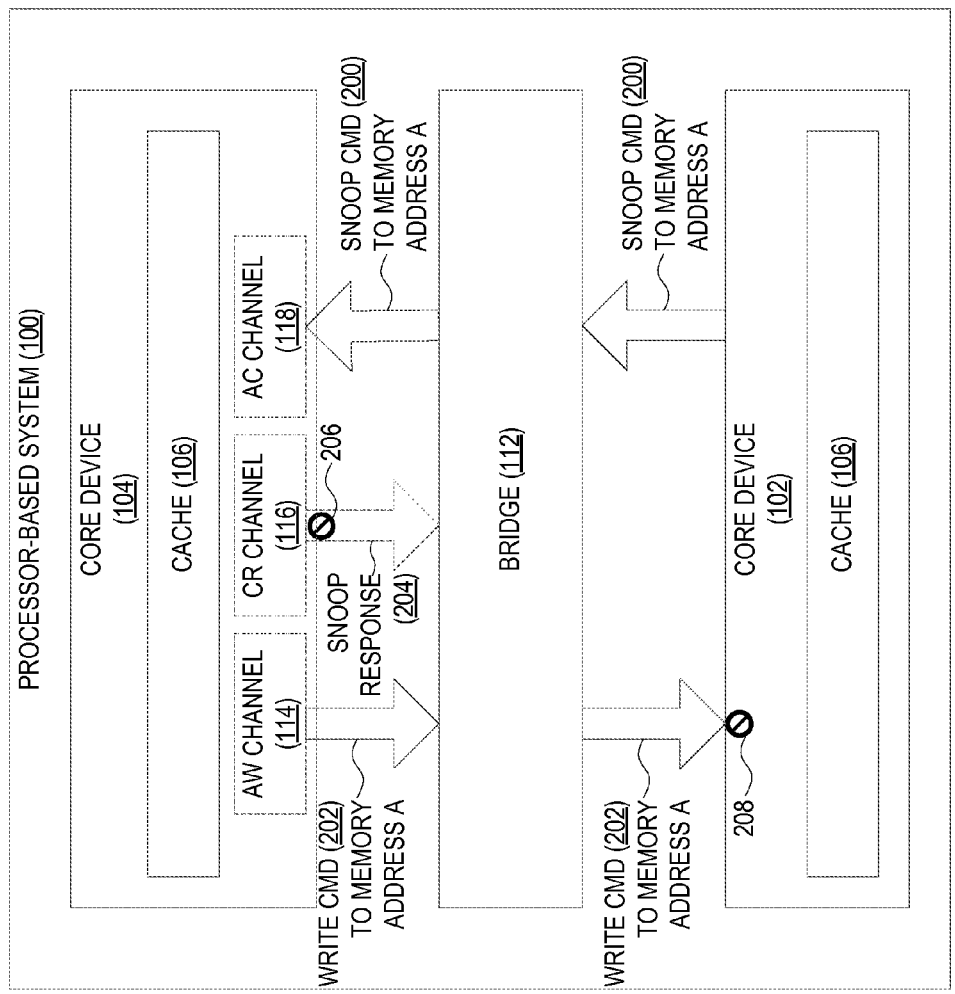
FIG. 2 is a block diagram illustrating exemplary communications flows between the first core device and the second core device in FIG. 1 that may result in a deadlock condition.

Aspects disclosed herein include avoiding deadlocks in processor-based systems employing retry and in-order-response non-retry bus coherency protocols. Before describing operations for avoiding deadlocks among cores devices that implement retry and in-order-response non-retry bus coherency protocols, exemplary circumstances under which a deadlock condition may arise among such core devices are discussed. In this regard, FIGS. 1 and 2 are provided. FIG. 1 illustrates an exemplary processor-based system in which deadlocks may arise between core devices, while FIG. 2 shows exemplary communications flows between the core devices that may give rise to a deadlock condition.

In FIG. 1, an exemplary processor-based system 100 in which deadlocks may arise includes a core device 102 and a core device 104. In some aspects, each of the core devices 102, 104 may comprise a central processing unit (CPU), a graphics processing unit (GPU), a processor cluster, and/or a hardware accelerator, as non-limiting examples. The core devices 102, 104 of the processor-based system 100 include corresponding caches 106, 108, which enable shared data (not shown) to be stored locally for quicker access by the core devices 102, 104.

The core devices 102, 104 of FIG. 1 are communicatively coupled to each other via busses 110 and 111 and a bridge 112. In this manner, each of the core devices 102, 104 may snoop read requests (not shown) sent by other core devices, and may provide snoop responses and/or intervention data. Each of the caches 106, 108 may store local copies of shared data, which can be read and/or modified by any of the core devices 102, 104. Thus, to ensure that the shared data stored in the caches 106, 108 is viewed in a consistent manner by the core devices 102, 104, each of the core devices 102, 104 implements a snoop-based bus coherency protocol. In the example of FIG. 1, the core device 102 implements a retry bus coherency protocol, such as a proprietary bus coherency protocol. The core device 104 implements an in-order-response non-retry bus coherency protocol (e.g., the Advanced Extensible Interface (AXI) Coherency Extensions (ACE) bus coherency protocol, as a non-limiting example). In aspects in which the core device 104 implements the ACE protocol, the core device 104 may provide an address write (AW) channel 114, a coherency response (CR) channel 116, and an address coherency (AC) channel 118. The address write channel 114 may be used by the core device 104 to send write commands. The coherency response channel 116 may be used by the core device 104 to answer snoop requests, while the address coherency channel 118 may be used by the core device 104 to send snoop requests.

Referring now to FIG. 2, a deadlock condition between the core device 102 and the core device 104 may arise as a result of the exemplary communications flows illustrated herein. In FIG. 2, the core device 102 sends a snoop command ("SNOOP CMD") 200 having a memory address A to the core device 104 via the bridge 112. Before the core device 104 processes the snoop command 200, the core device 104 asynchronously sends a write command ("WRITE CMD") 202, also having the memory address A, to the core device 102 via the bridge 112. Because of the dependency requirements of the in-order-response non-retry bus coherency protocol implemented by the core device 104, the core device 104 will not generate a snoop response 204 to the snoop command 200 until processing of the write command 202 has completed, as indicated by element 206. However, because the core device 102 detects that the memory address A of the write command 202 is the same as the still-pending snoop command 200 (i.e., an address hazard), the core device 102 will not process the write command 202 until the snoop response 204 to the snoop command 200 is received, as indicated by element 208. Thus, a deadlock condition occurs as each of the core devices 102, 104 is waiting on the other to complete an operation before proceeding. In some aspects, a deadlock may also occur if the write command 202 is "stuck" in an internal buffer (not shown) behind other commands that are being processed by the core device 104.

Figure 3:
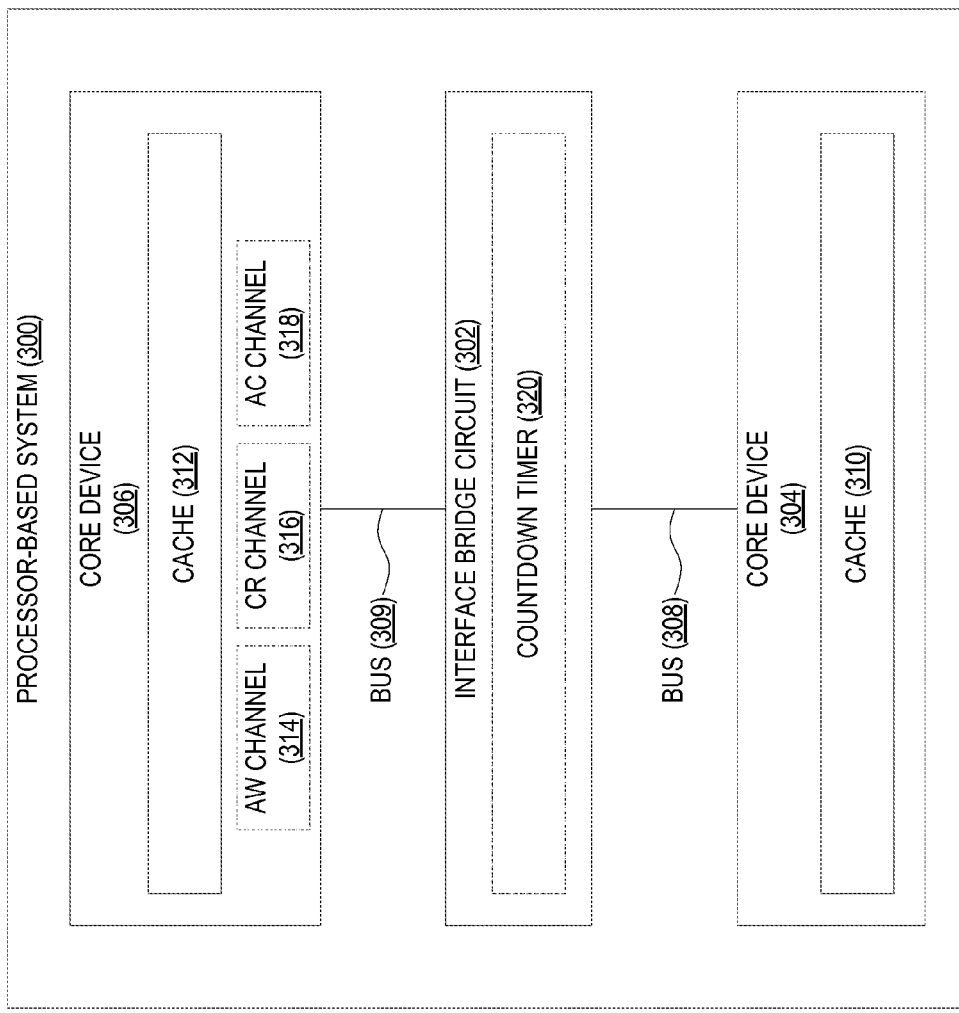
FIG. 3 is a block diagram of an exemplary processor-based system providing an interface bridge circuit for avoiding deadlocks between a first core device implementing a retry bus coherency protocol, and a second core device implementing an in-order-response non-retry bus coherency protocol.

Accordingly, to avoid deadlocks between core devices employing retry and in-order-response non-retry bus coherency protocols, an interface bridge circuit is provided as an interconnect between the core devices. In this regard, FIG. 3 illustrates an exemplary processor-based system 300 including an interface bridge circuit 302. The processor-based system 300 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages.

The interface bridge circuit 302 is communicatively coupled to a core device 304 and a core device 306 via busses 308 and 309. Each of the core devices 304, 306 may comprise a CPU, a GPU, a processor cluster, and/or a hardware accelerator, as non-limiting examples. It is to be understood that, in some aspects, the processor-based system 300 may contain more core devices than illustrated in FIG. 3, and the interconnections therebetween may vary from the connections shown in FIG. 3.

The core devices 304, 306 provide corresponding caches 310, 312 for storing local copies of shared data (not shown). Because the caches 310, 312 may store local copies of shared data which can be read and/or modified by any of the core devices 304, 306, each of the core devices 304, 306 implements a snoop-based bus coherency protocol to ensure that a consistent view of the shared data is presented to the core devices 304, 306. In FIG. 3, the core device 304 implements a retry bus coherency protocol (such as a proprietary bus coherency protocol), while the core device 306 implements an in-order-response non-retry bus coherency protocol (e.g., the ACE protocol, as a non-limiting example). According to aspects in which the core device 306 implements the ACE protocol, the core device 306 may provide an address write (AW) channel 314, a coherency response (CR) channel 316, and an address coherency (AC) channel 318, each having the same functionality as the corresponding elements of FIGS. 1 and 2.

The interface bridge circuit 302 is configured to detect a potential deadlock condition between the core devices 304, 306 resulting from the differing requirements of the retry bus coherency protocol used by the core device 304 and the in-order-response non-retry bus coherency protocol used by the core device 306. In some aspects, the interface bridge circuit 302 may detect a potential deadlock condition by detecting an address collision between a write command (not shown) issued by the core device 304 and a snoop command (not shown) issued by the core device 306. Some aspects may provide that the interface bridge circuit 302 may detect the potential deadlock condition by detecting that a countdown timer 320, activated by the interface bridge circuit 302 when a snoop command from the core device 304 waits for a snoop response, has expired. The countdown timer 320 may be reset by the interface bridge circuit 302 upon receiving a snoop response (not shown) from the core device 306 corresponding to the pending snoop command from the core device 304. The countdown timer 320 may use a preset timer value in some aspects, while according to some aspects the countdown timer 320 is a programmable countdown timer that uses a programmatically-set timer value.

Figure 4A:
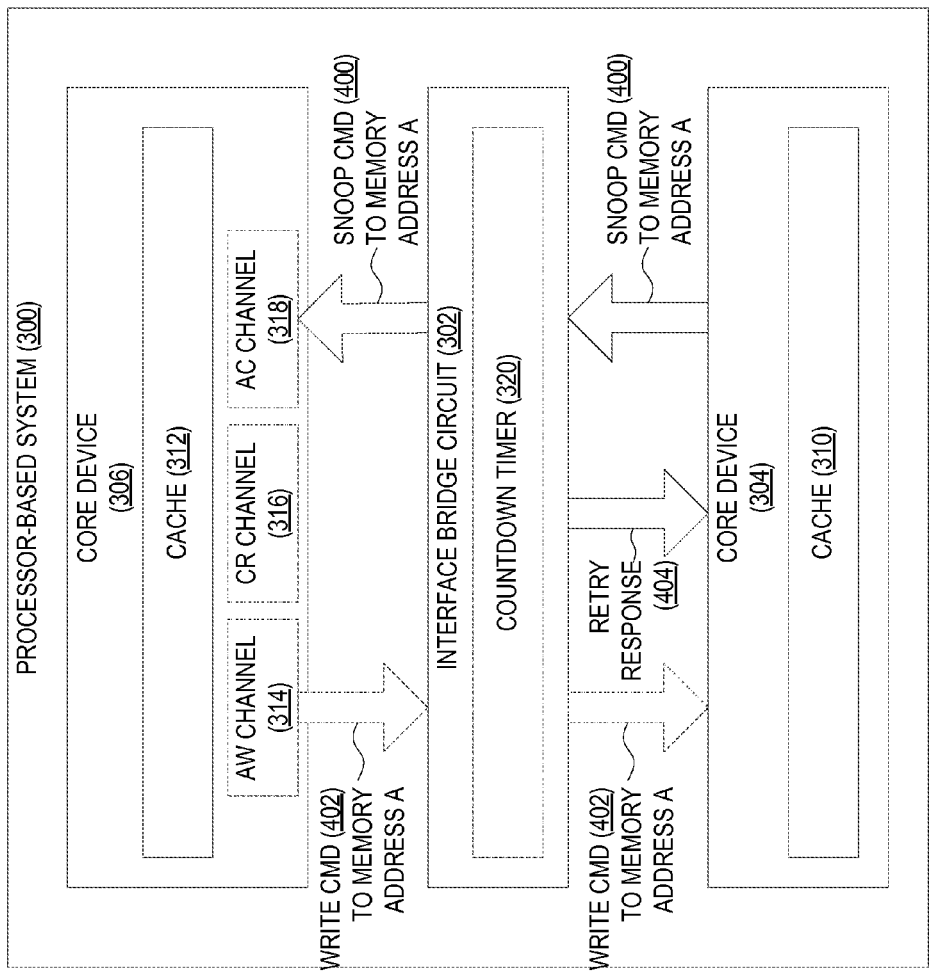
FIGS. 4A and 4B are block diagrams illustrating exemplary communications flows among the interface bridge circuit and the core devices of FIG. 3 for avoiding deadlocks between the core devices.
Figure 4B:
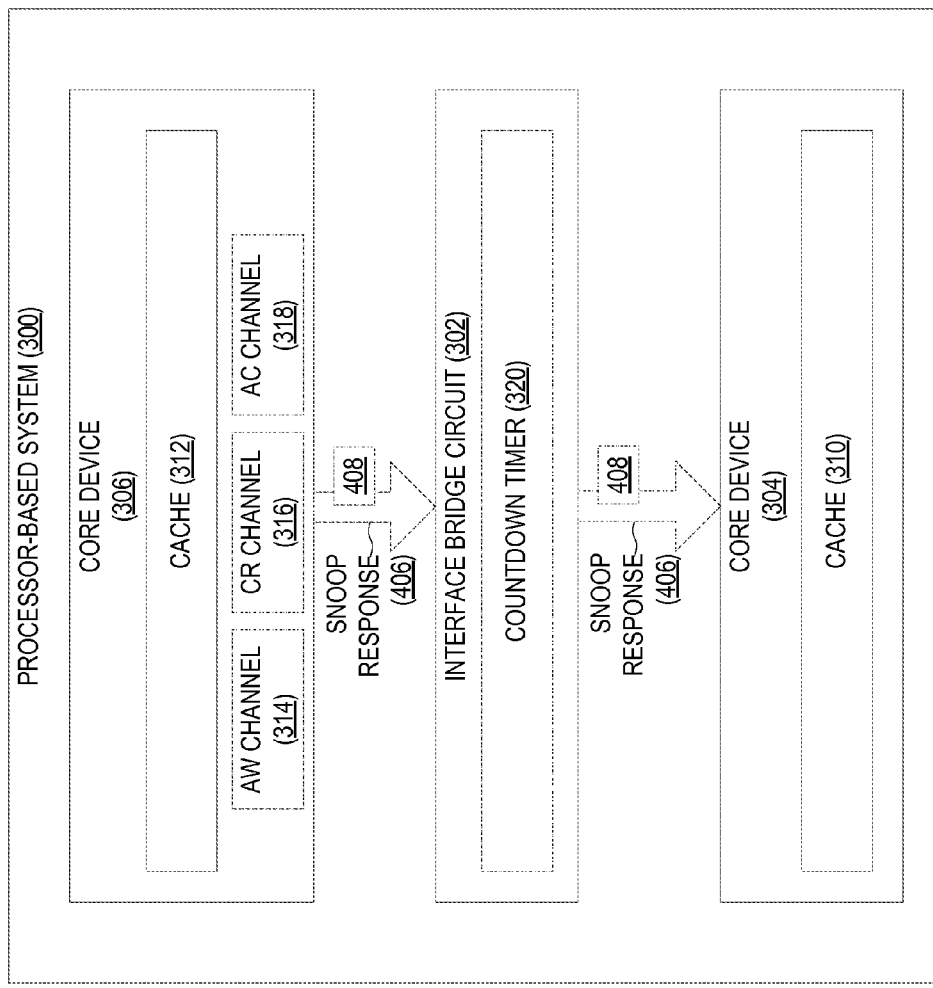

In response to detecting the potential deadlock condition (e.g., by detecting an address collision or an expiration of the countdown timer 320), the interface bridge circuit 302 is configured to send a retry response to the core device 304, as discussed in greater detail with respect to FIGS. 4A and 4B. In this manner, the core device 304 is able to continue processing, thereby eliminating the potential deadlock condition. As a non-limiting example, when a retry response is sent to the core device 304 as a result of an address collision between the snoop command and the write command, the core device 304 and/or the bus 308 may be able to resolve the dependency on the pending snoop command, and may proceed with processing the write command. Once the write command is completed by the core device 304, the core device 306 may then be free to respond to the original snoop command, thus avoiding the potential deadlock condition. Similarly, in aspects in which a retry response is sent to the core device 304 as a result of the expiration of the countdown timer 320, the core device 304 is able to continue processing while the core device 306 completes its in-progress operations.

FIGS. 4A and 4B are provided to illustrate exemplary communications flows among the interface bridge circuit 302 and the core devices 304, 306 of FIG. 3 for avoiding deadlocks between the core devices 304, 306. Elements of FIG. 3 are referenced in describing FIGS. 4A and 4B for the sake of clarity. Additionally, the bus 308 of FIG. 3 is omitted from FIGS. 4A and 4B.

In FIG. 4A, a snoop command ("SNOOP CMD") 400 to a memory address A is sent from the core device 304 to the interface bridge circuit 302, which forwards the snoop command 400 to the core device 306. In some aspects, the core device 306 may send a write command ("WRITE CMD") 402 to the same memory address A to the interface bridge circuit 302. In such aspects, the interface bridge circuit 302 may determine that an address hazard exists between the snoop command 400 and the write command 402, and accordingly may determine that a potential deadlock condition exists between the core devices 304, 306. Some aspects may provide that the countdown timer 320 is activated when the interface bridge circuit 302 receives the snoop command 400 and begins its wait for a snoop response (not shown) to the snoop command 400. The potential deadlock condition is detected when the interface bridge circuit 302 detects that the countdown timer 320 has expired before the snoop response is received from the core device 306. This potential deadlock condition may occur in circumstances in which the write command 402 is "stuck" behind other commands (not shown) being processed by the core device 306. Upon detecting the potential deadlock condition between the core devices 304, 306, the interface bridge circuit 302 sends a retry response 404 to the core device 304. In this manner, the core device 304 is able to continue processing, thus eliminating the potential deadlock condition.

As seen in FIG. 4B, in some aspects the interface bridge circuit 302 may receive a snoop response 406 from the core device 306 corresponding to the snoop command 400 from the core device 304. If the snoop response 406 is received by the interface bridge circuit 302 before the countdown timer 320 has expired, the countdown timer 320 may be reset. The snoop response 406 may be received after the potential deadlock condition has been detected and the retry response 404 has been sent to the core device 304. If the core device 304 retries the same snoop command 400 in the meantime, the retried snoop command 400 will be handled in the same fashion as the original snoop command 400 if the original snoop command 400 has not been completed by the interface bridge circuit 302. If the snoop response 406 contains modified data 408 (i.e., "dirty" data), the modified data 408 may be provided to the core device 304 as a response to the snoop command 400. The core device 304 may then perform a writeback operation (not shown) using the modified data 408. However, if the snoop response 406 does not contain the modified data 408, the interface bridge circuit 302 may discard the snoop response 406.

Figure 5A:
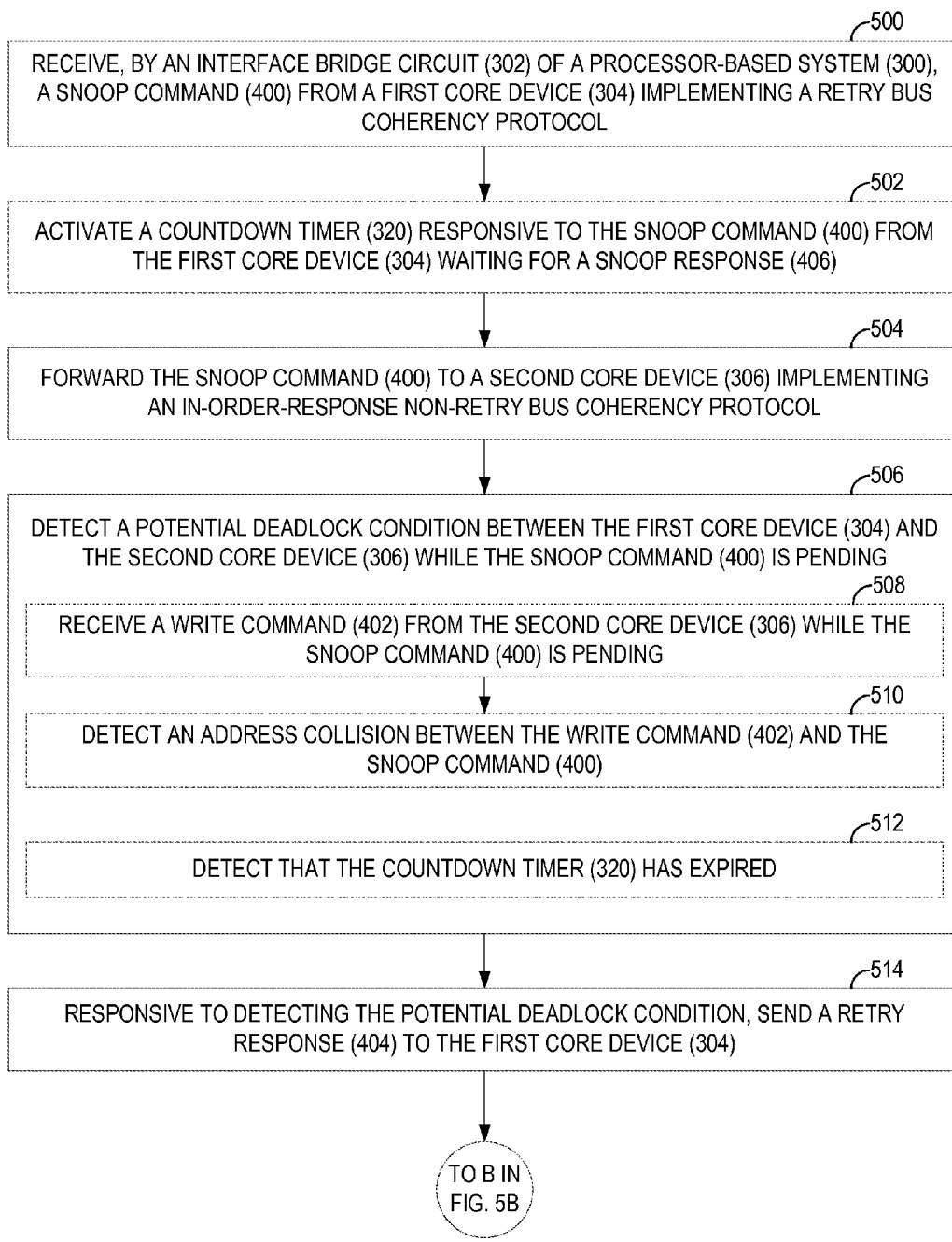
FIGS. 5A and 5B are flowcharts illustrating exemplary operations of the interface bridge circuit of FIG. 3 for avoiding deadlocks between the core devices.
Figure 5B:
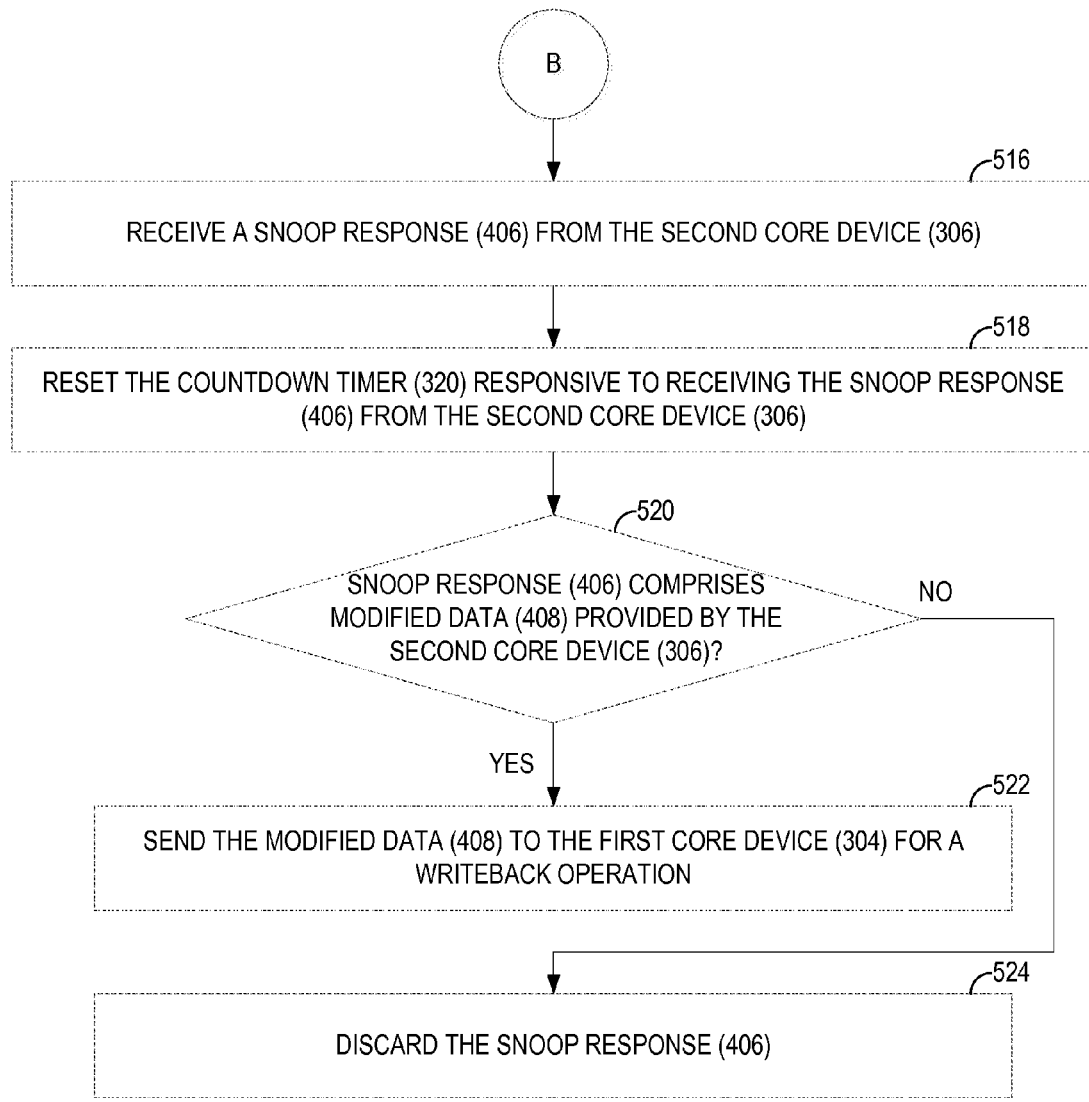

To illustrate exemplary operations of the interface bridge circuit 302 of FIG. 3 for avoiding deadlocks between the first core device 304 and the second core device 306, FIGS. 5A and 5B are provided. Elements of FIGS. 3, 4A, and 4B are referenced in describing FIGS. 5A and 5B for the sake of clarity. In FIG. 5A, operations begin with the interface bridge circuit 302 of the processor-based system 300 receiving a snoop command 400 from the first core device 304 implementing a retry bus coherency protocol (block 500). In this regard, the interface bridge circuit 302 may be referred to herein as "a means for receiving a snoop command from a first core device implementing a retry bus coherency protocol." In some aspects, the retry bus coherency protocol implemented by the first core device 304 may comprise a proprietary bus protocol that supports retry responses to snoop commands.

In aspects in which the interface bridge circuit 302 provides the countdown timer 320 for detecting a potential deadlock condition, the interface bridge circuit 302 may activate the countdown timer 320 responsive to the interface bridge circuit 302 receiving the snoop command 400 from the first core device 304 and beginning its wait for a snoop response 406 to the snoop command 400 (block 502). Accordingly, the interface bridge circuit 302 may be referred to herein as "a means for activating a countdown timer responsive to the snoop command from the first core device waiting for a snoop response." The interface bridge circuit 302 then forwards the snoop command 400 to the second core device 306 of the processor-based system 300 implementing an in-order-response non-retry bus coherency protocol (block 504). The interface bridge circuit 302 thus may be referred to herein as "a means for forwarding the snoop command to a second core device implementing an in-order-response non-retry bus coherency protocol." According to some aspects, the in-order-response non-retry bus coherency protocol implemented by the second core device 306 may comprise the ACE bus coherency protocol.

The interface bridge circuit 302 next detects a potential deadlock condition between the first core device 304 and the second core device 306 while the snoop command 400 is pending (block 506). In this regard, the interface bridge circuit 302 may be referred to herein as "a means for detecting a potential deadlock condition between the first core device and the second core device while the snoop command is pending." In some aspects, operations of block 506 for detecting the potential deadlock condition may comprise the interface bridge circuit 302 receiving the write command 402 from the second core device 306 while the snoop command 400 is pending (block 508). Accordingly, the interface bridge circuit 302 may be referred to herein as "a means for receiving a write command from the second core device while the snoop command is pending." The interface bridge circuit 302 may then detect an address collision between the write command 402 and the snoop command 400 (block 510). The interface bridge circuit 302 thus may be referred to herein as "a means for detecting an address collision between the write command and the snoop command." Some aspects may provide that operations of block 506 for detecting the potential deadlock condition may comprise the interface bridge circuit 302 detecting that the countdown timer 320 has expired (block 512). In this regard, the interface bridge circuit 302 may be referred to herein as "a means for detecting that the countdown timer has expired."

In response to detecting the potential deadlock condition, the interface bridge circuit 302 sends a retry response 404 to the first core device 304 (block 514). Accordingly, the interface bridge circuit 302 may be referred to herein as "a means for sending a retry response to the first core device responsive to detecting the potential deadlock condition." By sending the retry response 404 to the first core device 304, the interface bridge circuit 302 enables the first core device 304 to continue processing, thus eliminating the potential deadlock condition between the first core device 304 and the second core device 306. In some aspects, processing may then resume at block 516 of FIG. 5B.

Referring now to FIG. 5B, the interface bridge circuit 302 according to some aspects may receive a snoop response 406 from the second core device 306 (block 516). The interface bridge circuit 302 thus may be referred to herein as "a means for receiving a snoop response from the second core device." Upon receiving the snoop response 406 from the second core device 306, the interface bridge circuit 302 may reset the countdown timer 320 (block 518). In this regard, the interface bridge circuit 302 may be referred to herein as "a means for resetting the countdown timer responsive to receiving the snoop response from the second core device." In some aspects, the snoop response 406 may be received after the potential deadlock condition has been detected and the retry response 404 has been sent to the first core device 304. If the first core device 304 retries the same snoop command 400 in the meantime, the retried snoop command 400 will be handled in the same fashion as the original snoop command 400 if the original snoop command 400 has not been completed by the interface bridge circuit 302.

The interface bridge circuit 302 may then determine whether the snoop response 406 comprises modified data 408 that was provided by the second core device 306 (block 520). Accordingly, the interface bridge circuit 302 may be referred to herein as "a means for determining whether the snoop response comprises modified data provided by the second core device." If the interface bridge circuit 302 determines at decision block 520 that the snoop response 406 comprises the modified data 408, the interface bridge circuit 302 may send the modified data 408 to the first core device 304 for a writeback operation (block 522). The interface bridge circuit 302 thus may be referred to herein as "a means for, responsive to determining that the snoop response comprises modified data provided by the second core device, sending the modified data to the first core device for a writeback operation." However, if the interface bridge circuit 302 determines at decision block 520 that the snoop response 406 does not comprise the modified data 408, the interface bridge circuit 302 may discard the snoop response 406 (block 524). In this regard, the interface bridge circuit 302 may be referred to herein as "a means for, responsive to determining that the snoop response does not comprise the modified data provided by the second core device, discarding the snoop response."

Avoiding deadlocks in processor-based systems employing retry and in-order-response non-retry bus coherency protocols according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a phablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 6:
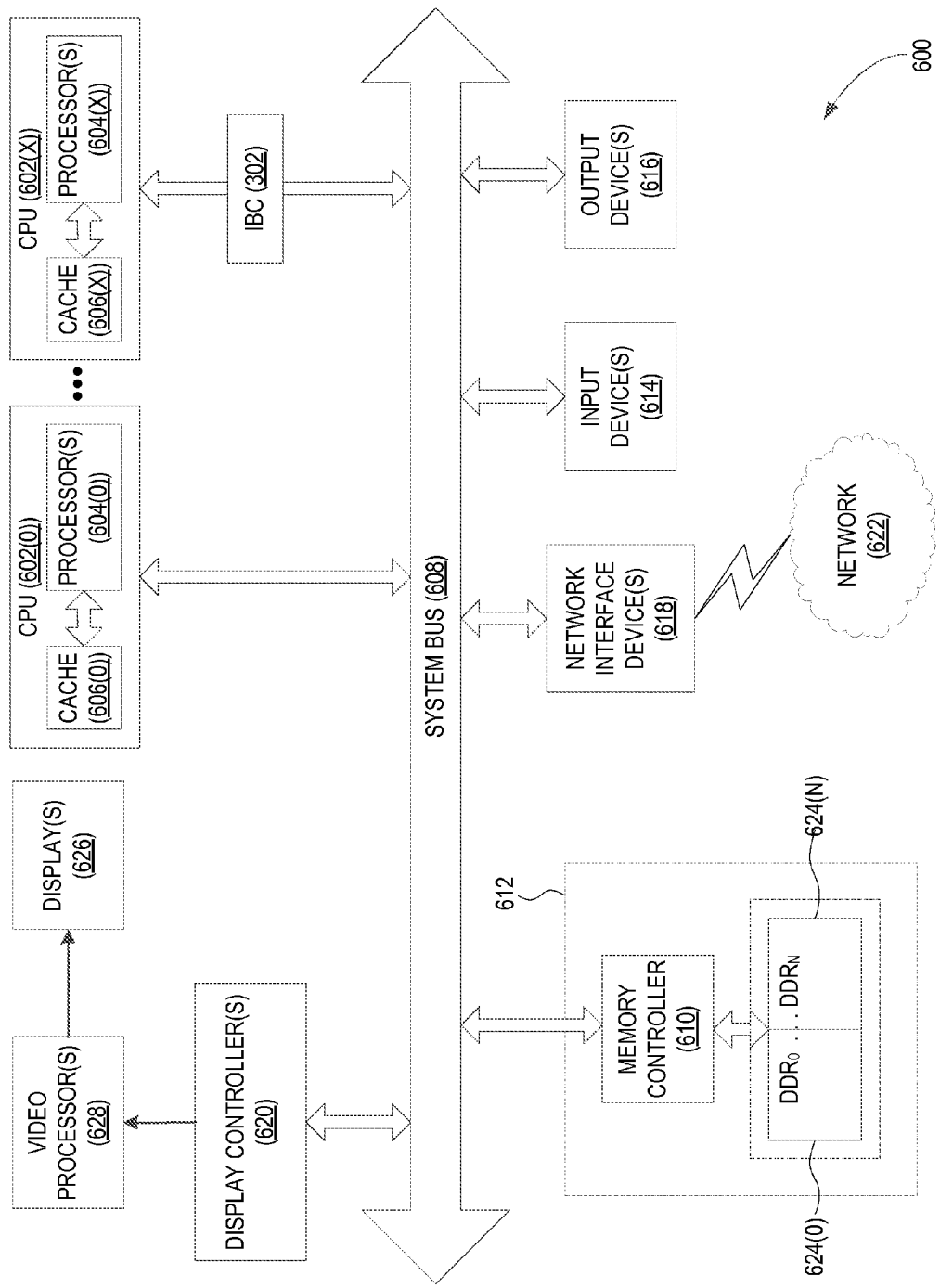
FIG. 6 is a block diagram of an exemplary processor-based system that can include the interface bridge circuit of FIG. 3.

In this regard, FIG. 6 illustrates an example of a processor-based system 600 that can employ the interface bridge circuit (IBC) 302 illustrated in FIG. 3. In this example, the processor-based system 600 may correspond to the processor-based system 300 of FIG. 3. The processor-based system 600 includes one or more CPUs 602(0)-602(X), each including one or more processors 604(0)-604(X). The CPU(s) 602(0)-602(X) may correspond to the core devices 102 and 104, respectively. The CPU(s) 602(0)-602(X) may have cache memory 606(0)-606(X) coupled to the processor(s) 604(0)-604(X) for rapid access to temporarily stored data. The CPU(s) 602(0)-602(X) are coupled to a system bus 608 and can intercouple master and slave devices included in the processor-based system 600. As is well known, the CPU(s) 602(0)-602(X) communicates with these other devices by exchanging address, control, and data information over the system bus 608. For example, the CPU(s) 602(0)-602(X) can communicate bus transaction requests to a memory controller 610 as an example of a slave device.

Other master and slave devices can be connected to the system bus 608. As illustrated in FIG. 6, these devices can include a memory system 612, one or more input devices 614, one or more output devices 616, one or more network interface devices 618, and one or more display controllers 620, as examples. The input device(s) 614 can include any type of input device, including but not limited to input keys, switches, voice processors, etc. The output device(s) 616 can include any type of output device, including, but not limited to, audio, video, other visual indicators, etc. The network interface device(s) 618 can be any devices configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include one or more memory units 624(0-N).

The CPU(s) 602 may also be configured to access the display controller(s) 620 over the system bus 608 to control information sent to one or more displays 626. The display controller(s) 620 sends information to the display(s) 626 to be displayed via one or more video processors 628, which process the information to be displayed into a format suitable for the display(s) 626. The display(s) 626 can include any type of display, including but not limited to, a cathode ray tube (CRT), a liquid crystal display (LCD), a plasma display, etc.

Those of skill in the art will further appreciate that aspects described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for avoiding deadlocks among cores of processor-based systems, comprising:
   receiving, by an interface bridge circuit of a processor-based system, a snoop command from a first core device implementing a retry bus coherency protocol;
   forwarding the snoop command to a second core device implementing an in-order-response non-retry bus coherency protocol;

detecting a potential deadlock condition between the first core device and the second core device while the snoop command is pending; and responsive to detecting the potential deadlock condition, sending a retry response to the first core device.

2. The method of claim 1, wherein detecting the potential deadlock condition between the first core device and the second core device comprises:

receiving a write command from the second core device while the snoop command is pending; and detecting an address collision between the write command and the snoop command.

3. The method of claim 1, further comprising:

activating a countdown timer responsive to the interface bridge circuit receiving the snoop command from the first core device and waiting for a snoop response; and resetting the countdown timer responsive to receiving the snoop response from the second core device;

wherein detecting the potential deadlock condition between the first core device and the second core device comprises detecting that the countdown timer has expired.

4. The method of claim 3, wherein the countdown timer comprises a programmable countdown timer.

5. The method of claim 1, further comprising:

receiving a snoop response from the second core device;

determining whether the snoop response comprises modified data provided by the second core device;

responsive to determining that the snoop response comprises the modified data provided by the second core device, sending the modified data to the first core device for a writeback operation; and responsive to determining that the snoop response does not comprise the modified data provided by the second core device, discarding the snoop response.

6. The method of claim 1, wherein the in-order-response non-retry bus coherency protocol comprises an Advanced Extensible Interface (AXI) Coherency Extensions (ACE) bus coherency protocol.

7. An interface bridge circuit configured to:

receive a snoop command from a first core device implementing a retry bus coherency protocol;

forward the snoop command to a second core device implementing an in-order-response non-retry bus coherency protocol;

detect a potential deadlock condition between the first core device and the second core device while the snoop command is pending; and responsive to detecting the potential deadlock condition, send a retry response to the first core device.

8. The interface bridge circuit of claim 7, configured to detect the potential deadlock condition between the first core device and the second core device by:

receiving a write command from the second core device while the snoop command is pending; and detecting an address collision between the write command and the snoop command.

9. The interface bridge circuit of claim 7, comprising a countdown timer;

the interface bridge circuit further configured to:

activate the countdown timer responsive to the interface bridge circuit receiving the snoop command from the first core device and waiting for a snoop response; and reset the countdown timer responsive to receiving the snoop response from the second core device;

wherein the interface bridge circuit is configured to detect the potential deadlock condition between the first core device and the second core device by detecting that the countdown timer has expired.

10. The interface bridge circuit of claim 9, wherein the countdown timer comprises a programmable countdown timer.

11. The interface bridge circuit of claim 7, further configured to:

receive a snoop response from the second core device;

determine whether the snoop response comprises modified data provided by the second core device;

responsive to determining that the snoop response comprises the modified data provided by the second core device, send the modified data to the first core device for a writeback operation; and responsive to determining that the snoop response does not comprised the modified data provided by the second core device, discard the snoop response.

12. The interface bridge circuit of claim 7, wherein the in-order-response non-retry bus coherency protocol comprises an Advanced Extensible Interface (AXI) Coherency Extensions (ACE) bus coherency protocol.

13. The interface bridge circuit of claim 7 integrated into an integrated circuit (IC).

14. The interface bridge circuit of claim 7 integrated into a device selected from the group consisting of: a set top box; an entertainment unit; a navigation device; a communications device; a fixed location data unit; a mobile location data unit; a mobile phone; a cellular phone; a smart phone; a tablet; a phablet; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

15. A processor-based system comprising:

a first core device implementing a retry bus coherency protocol;

a second core device implementing an in-order-response non-retry bus coherency protocol; and an interface bridge circuit communicatively coupled to the first core device and the second core device;

wherein the interface bridge circuit is configured to:

receive a snoop command from the first core device;

forward the snoop command to the second core device;

detect a potential deadlock condition between the first core device and the second core device while the snoop command is pending; and responsive to detecting the potential deadlock condition, send a retry response to the first core device.

16. An interface bridge circuit comprising:

a means for receiving a snoop command from a first core device implementing a retry bus coherency protocol;

a means for forwarding the snoop command to a second core device implementing an in-order-response non-retry bus coherency protocol;

a means for detecting a potential deadlock condition between the first core device and the second core device while the snoop command is pending; and a means for sending a retry response to the first core device responsive to detecting the potential deadlock condition.

17. The interface bridge circuit of claim 16, wherein the means for detecting the potential deadlock condition between the first core device and the second core device comprises:
- a means for receiving a write command from the second core device while the snoop command is pending; and
- a means for detecting an address collision between the write command and the snoop command.

18. The interface bridge circuit of claim 16, further comprising:
- a means for activating a countdown timer responsive to the interface bridge circuit receiving the snoop command from the first core device and waiting for a snoop response; and
- a means for resetting the countdown timer responsive to receiving the snoop response from the second core device;
- wherein the means for detecting the potential deadlock condition between the first core device and the second core device comprises a means for detecting that the countdown timer has expired.

19. The interface bridge circuit of claim 18, wherein the countdown timer comprises a programmable countdown timer.

20. The interface bridge circuit of claim 16, further comprising:
- a means for receiving a snoop response from the second core device;
- a means for determining whether the snoop response comprises modified data provided by the second core device;
- a means for, responsive to determining that the snoop response comprises the modified data provided by the second core device, sending the modified data to the first core device for a writeback operation; and
- a means for, responsive to determining that the snoop response does not comprise the modified data provided by the second core device, discarding the snoop response.

21. The interface bridge circuit of claim 16, wherein the in-order-response non-retry bus coherency protocol comprises an Advanced Extensible Interface (AXI) Coherency Extensions (ACE) bus coherency protocol.

* * * * *